May 19, 1931. E. W. CLARKE ET AL 1,806,146
APPARATUS AND PROCESS FOR COKING LIQUEFIABLE CARBONACEOUS MATERIALS
Filed Oct. 6, 1921 14 Sheets-Sheet 10
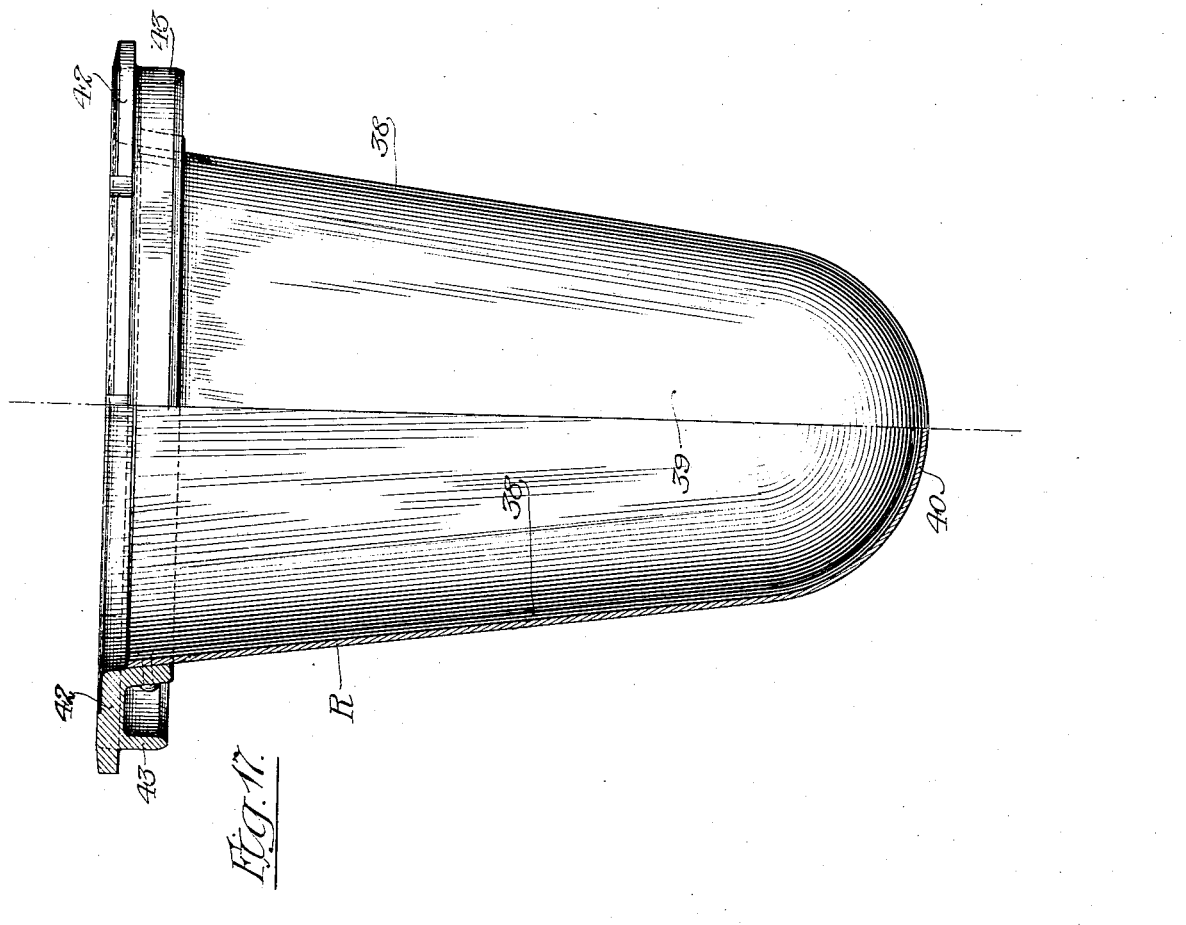

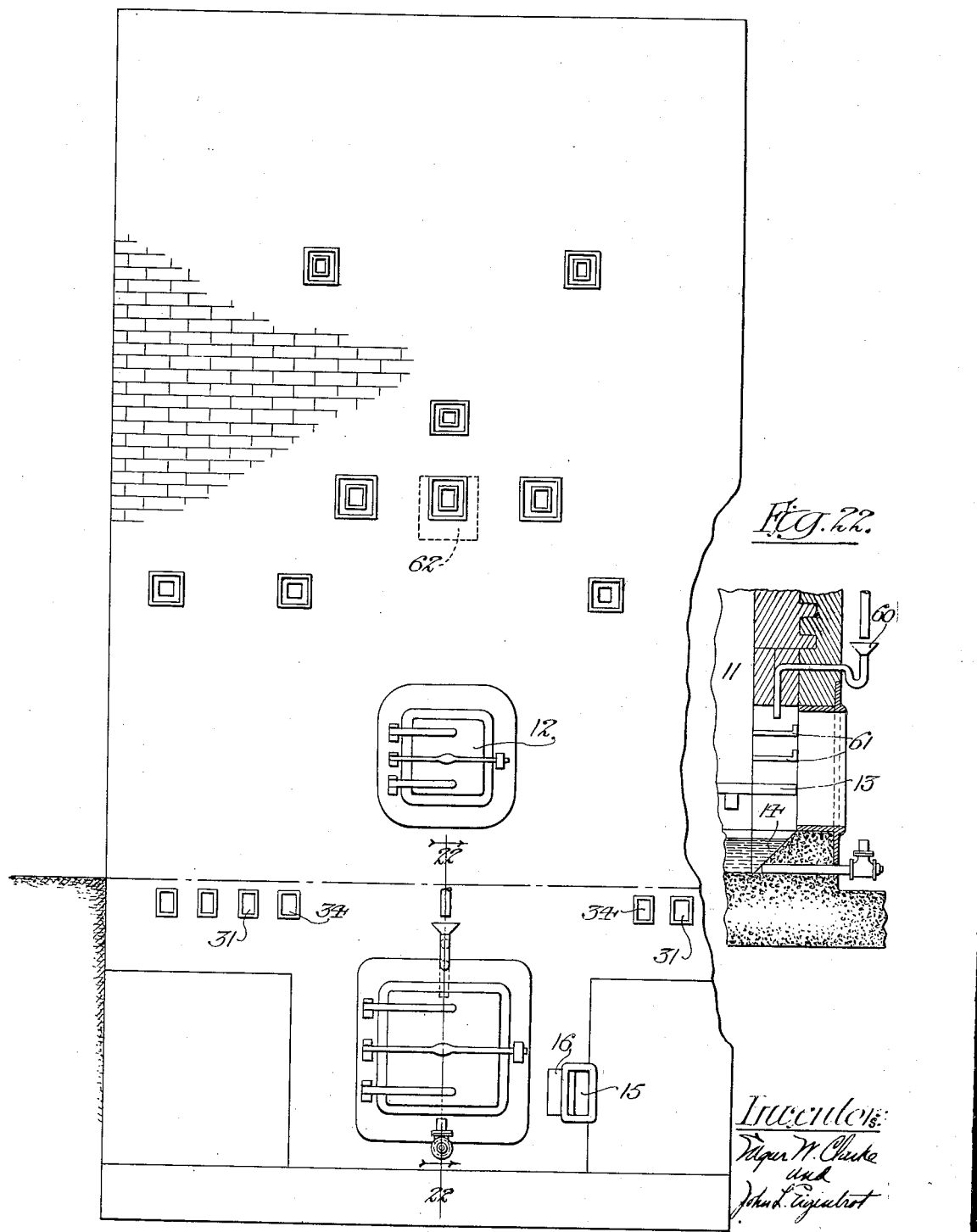

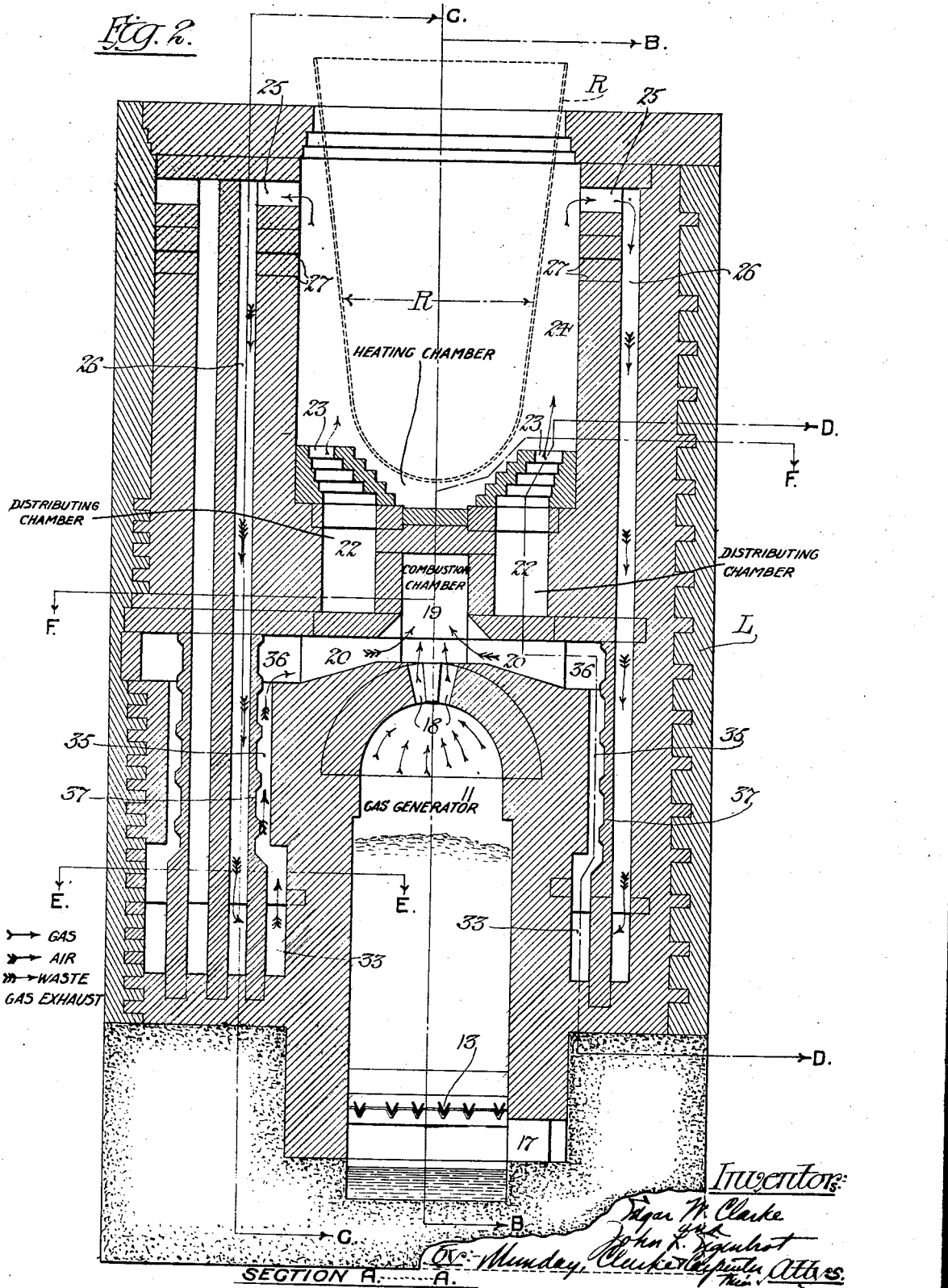

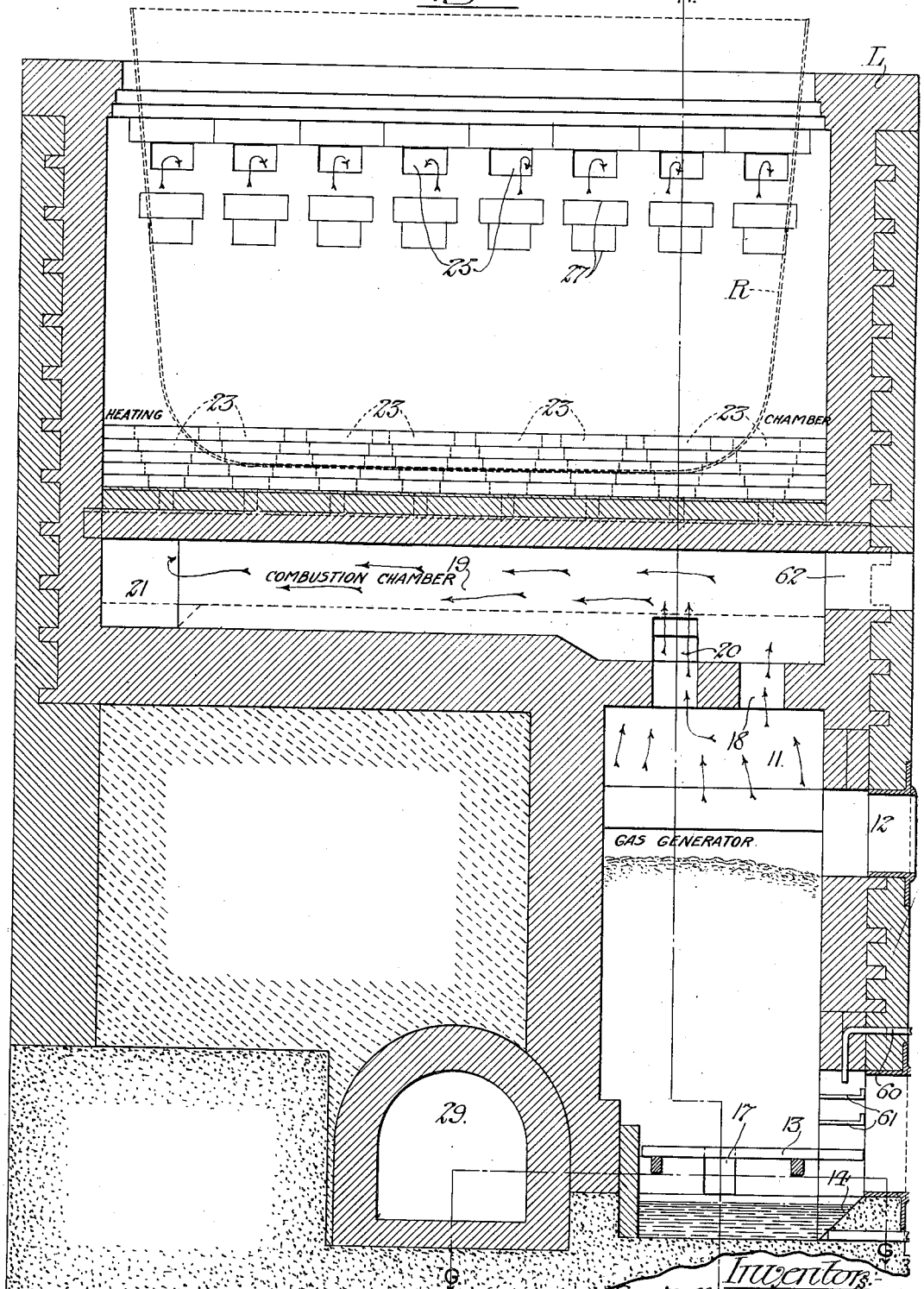

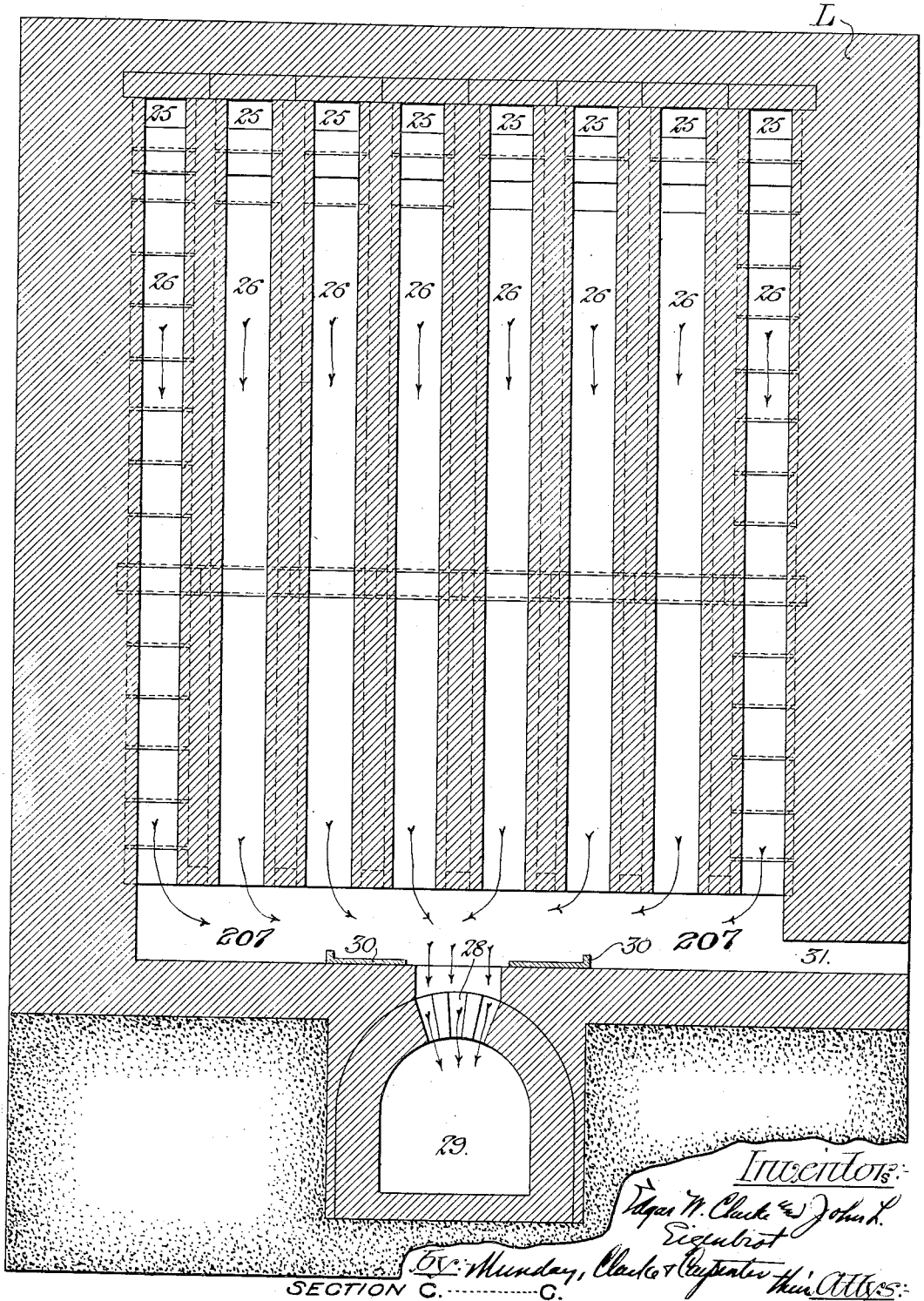

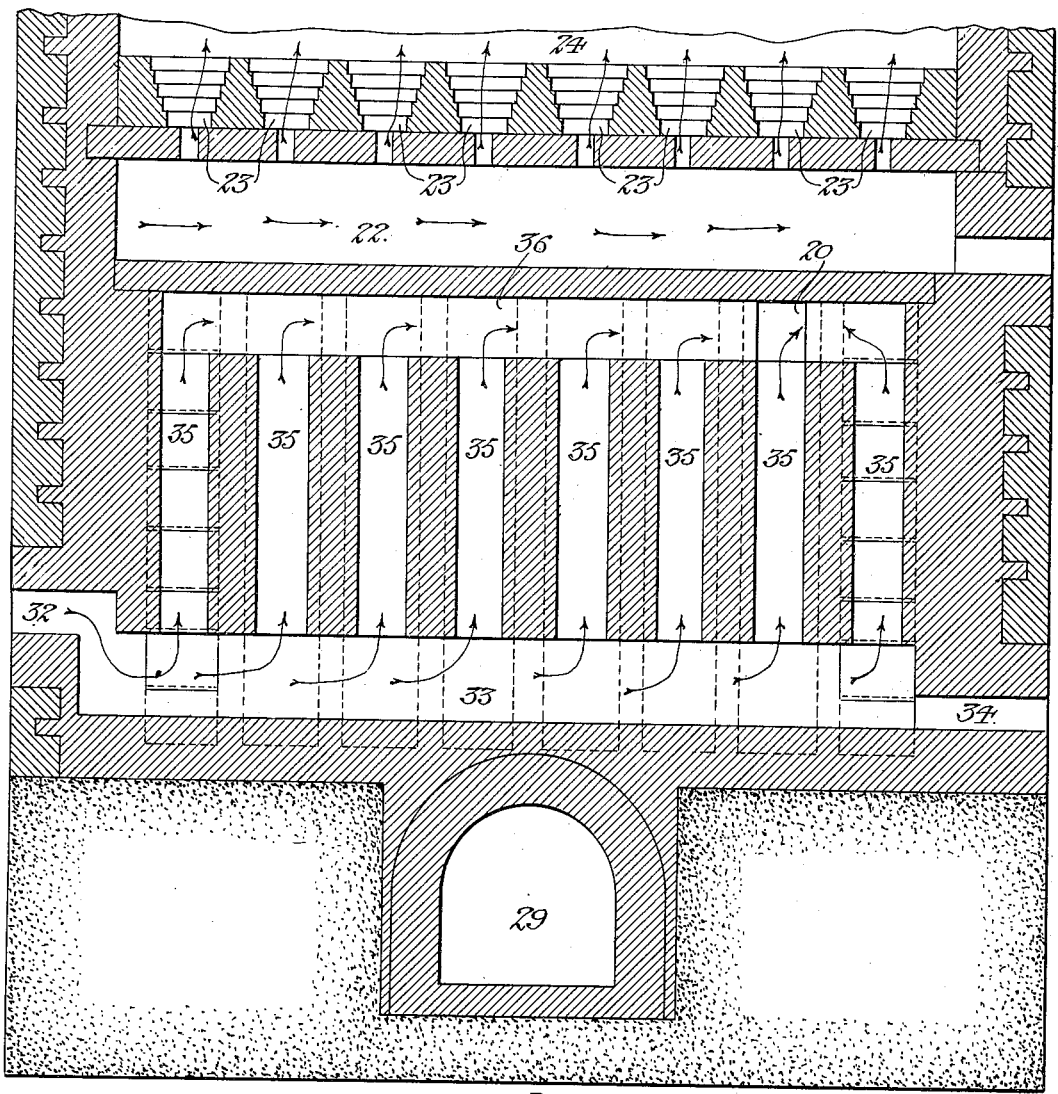

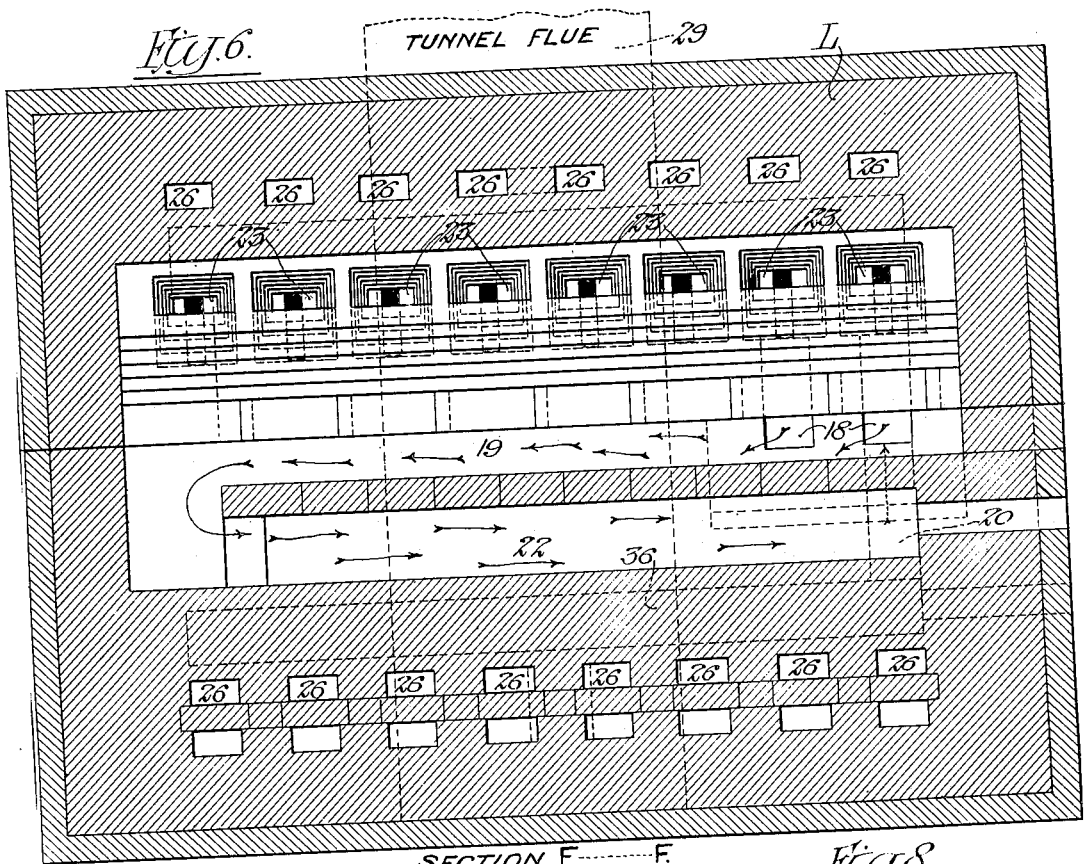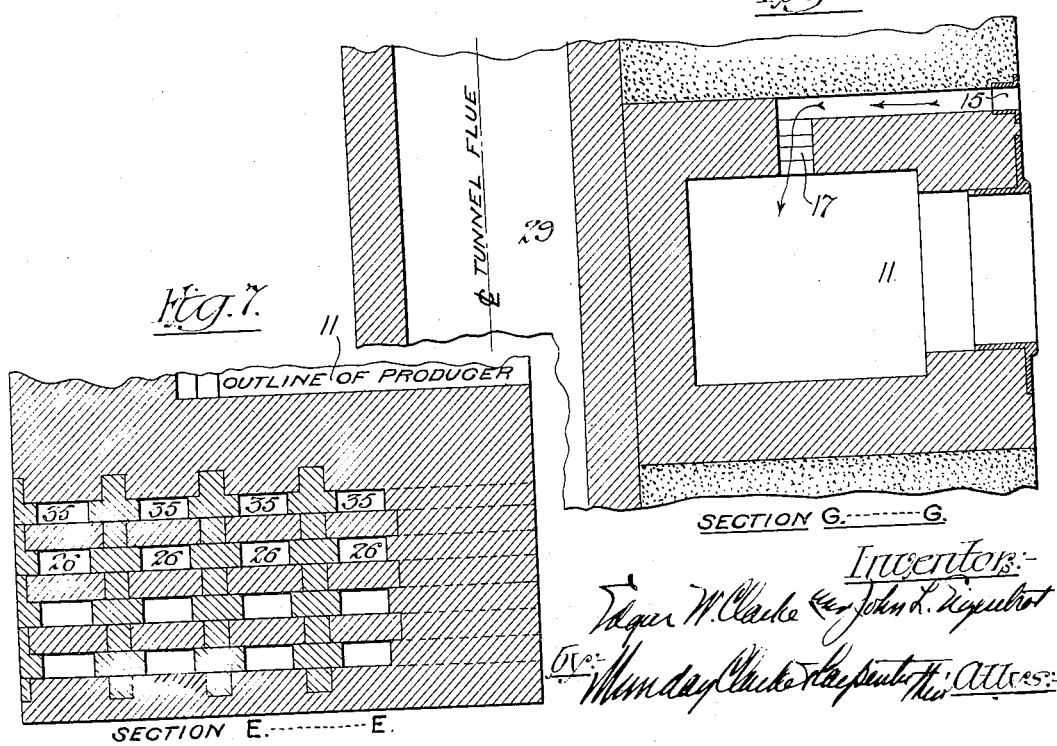

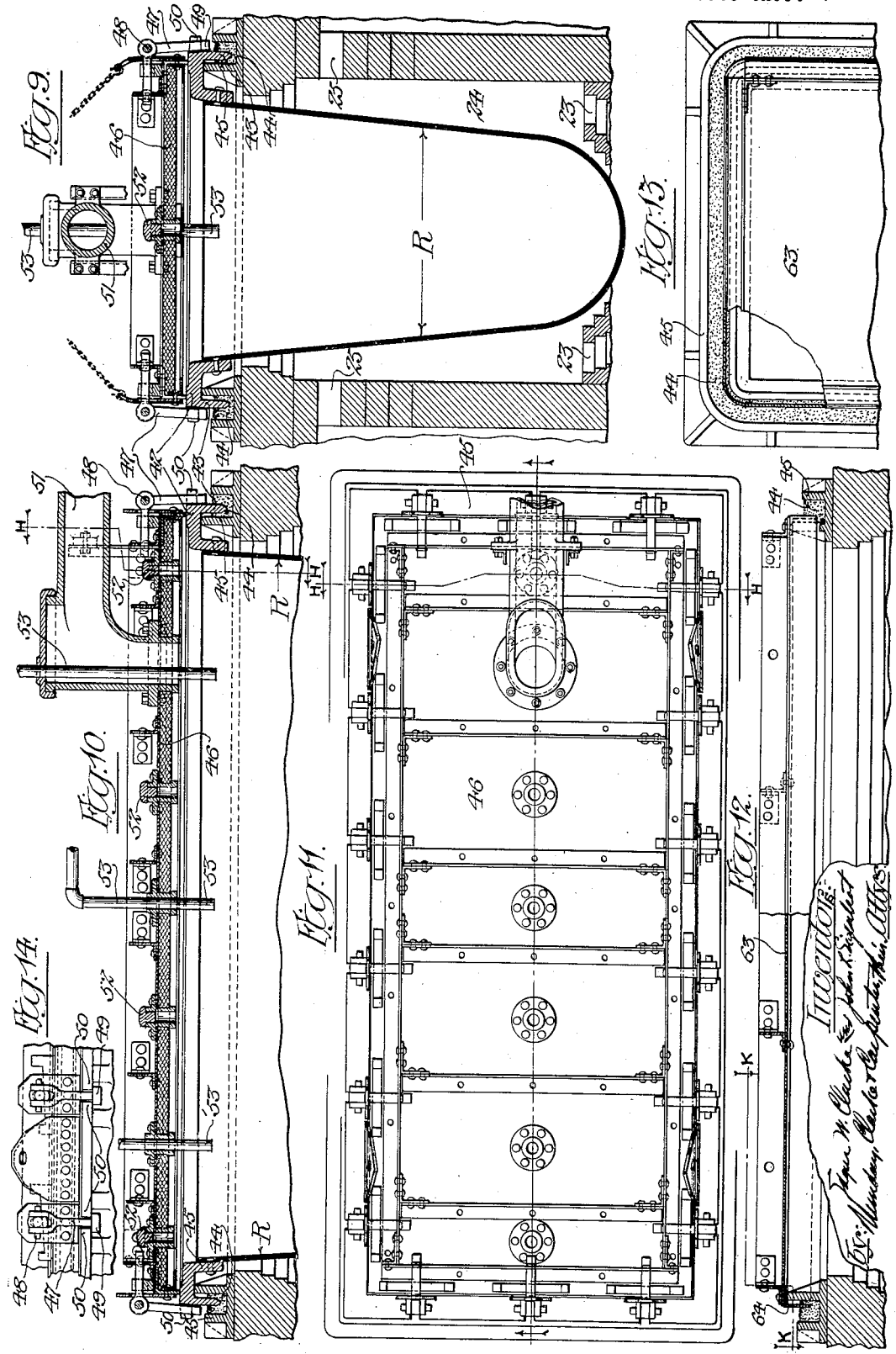

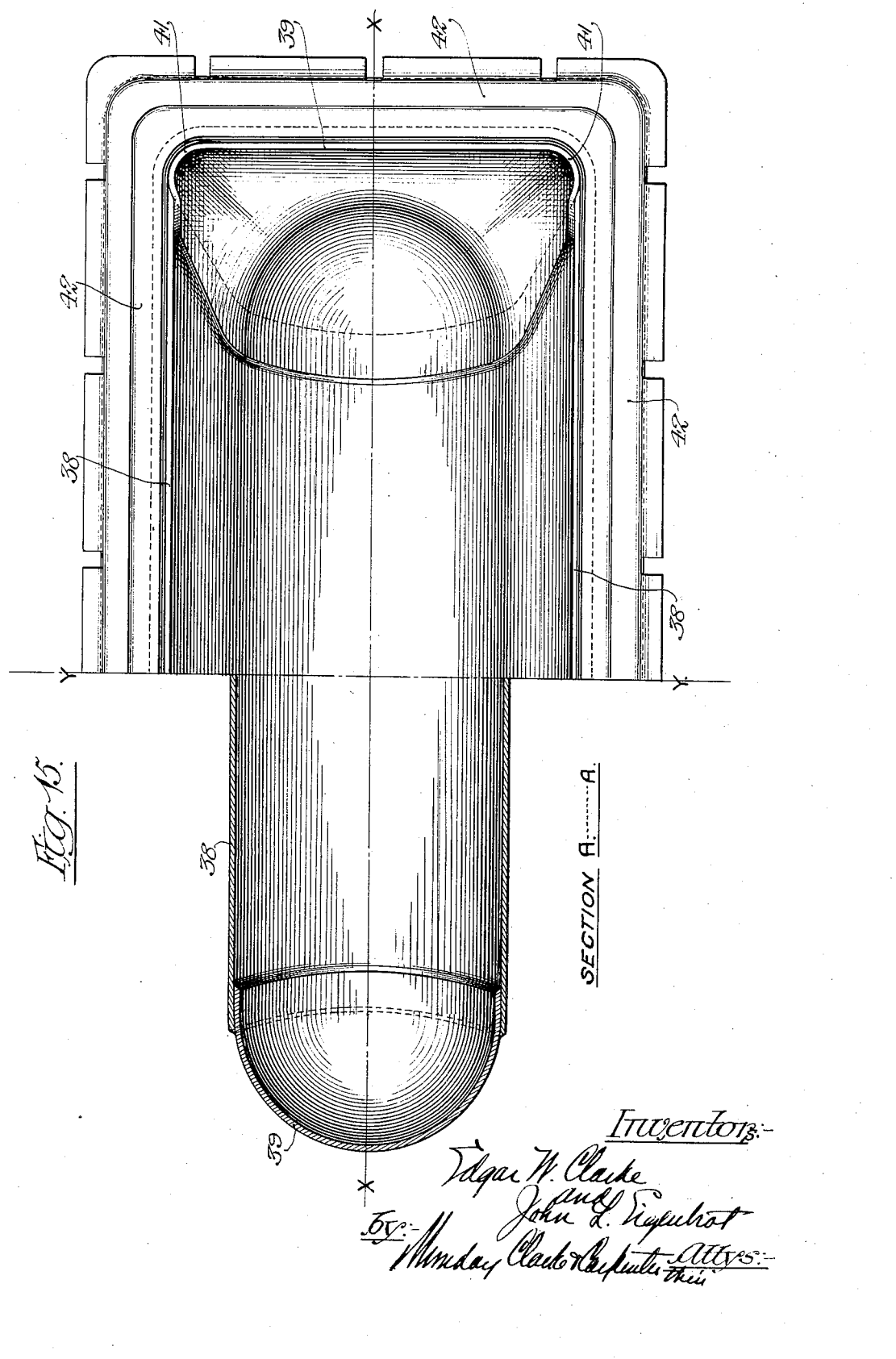

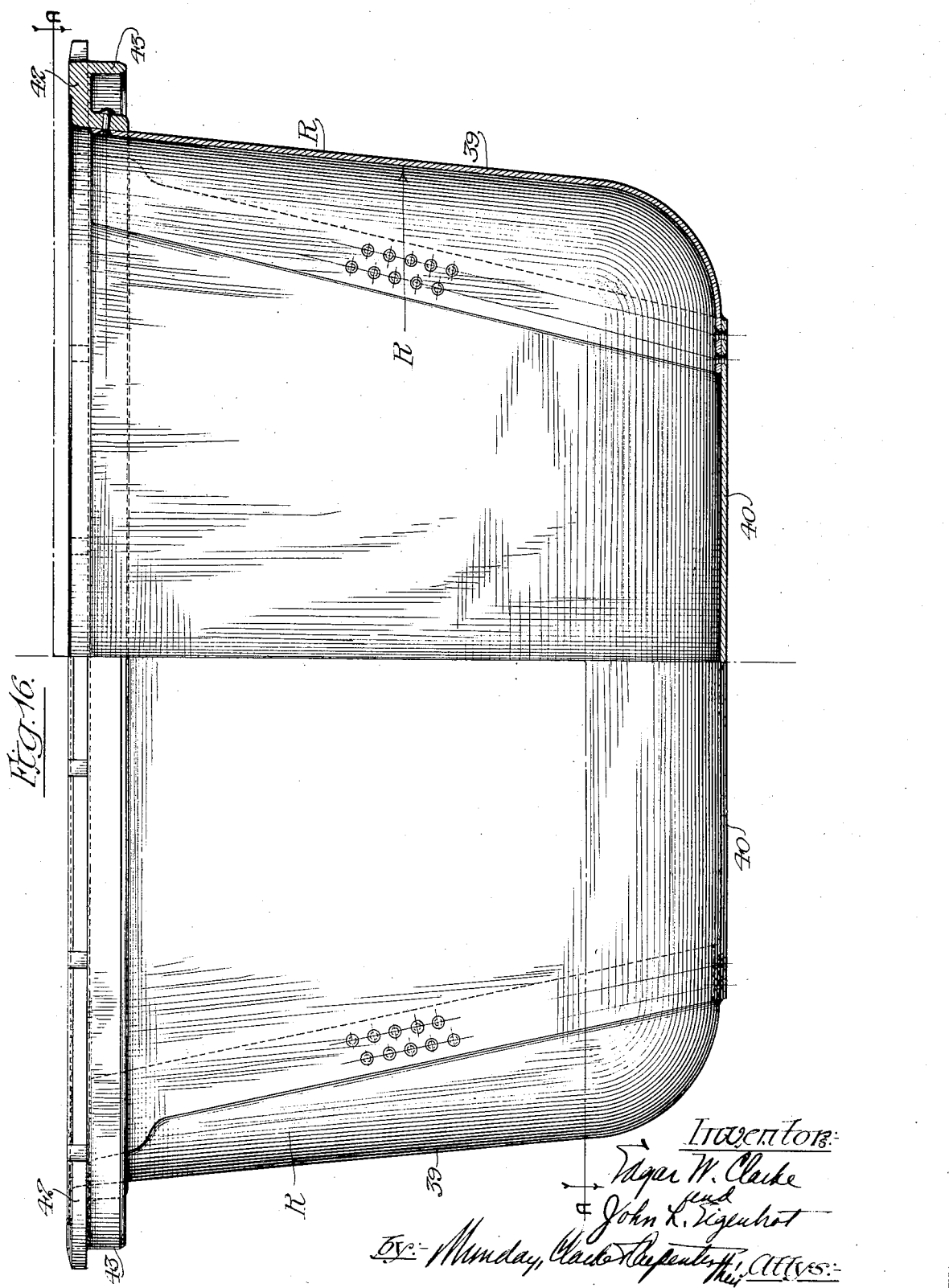

May 19, 1931. E. W. CLARKE ET AL 1,806,146
APPARATUS AND PROCESS FOR COKING LIQUEFIABLE CARBONACEOUS MATERIALS
Filed Oct. 6, 1921 14 Sheets-Sheet 11
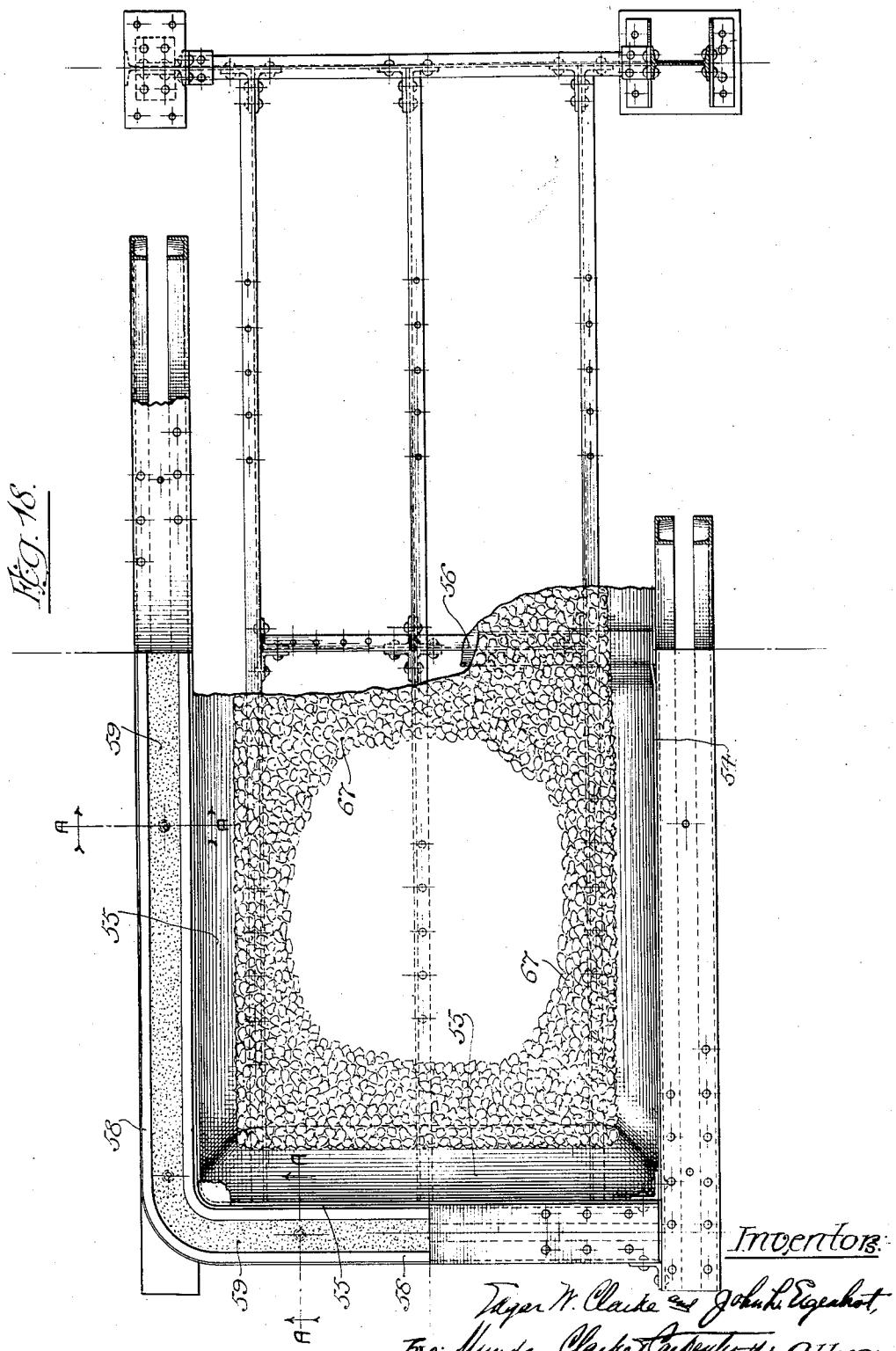

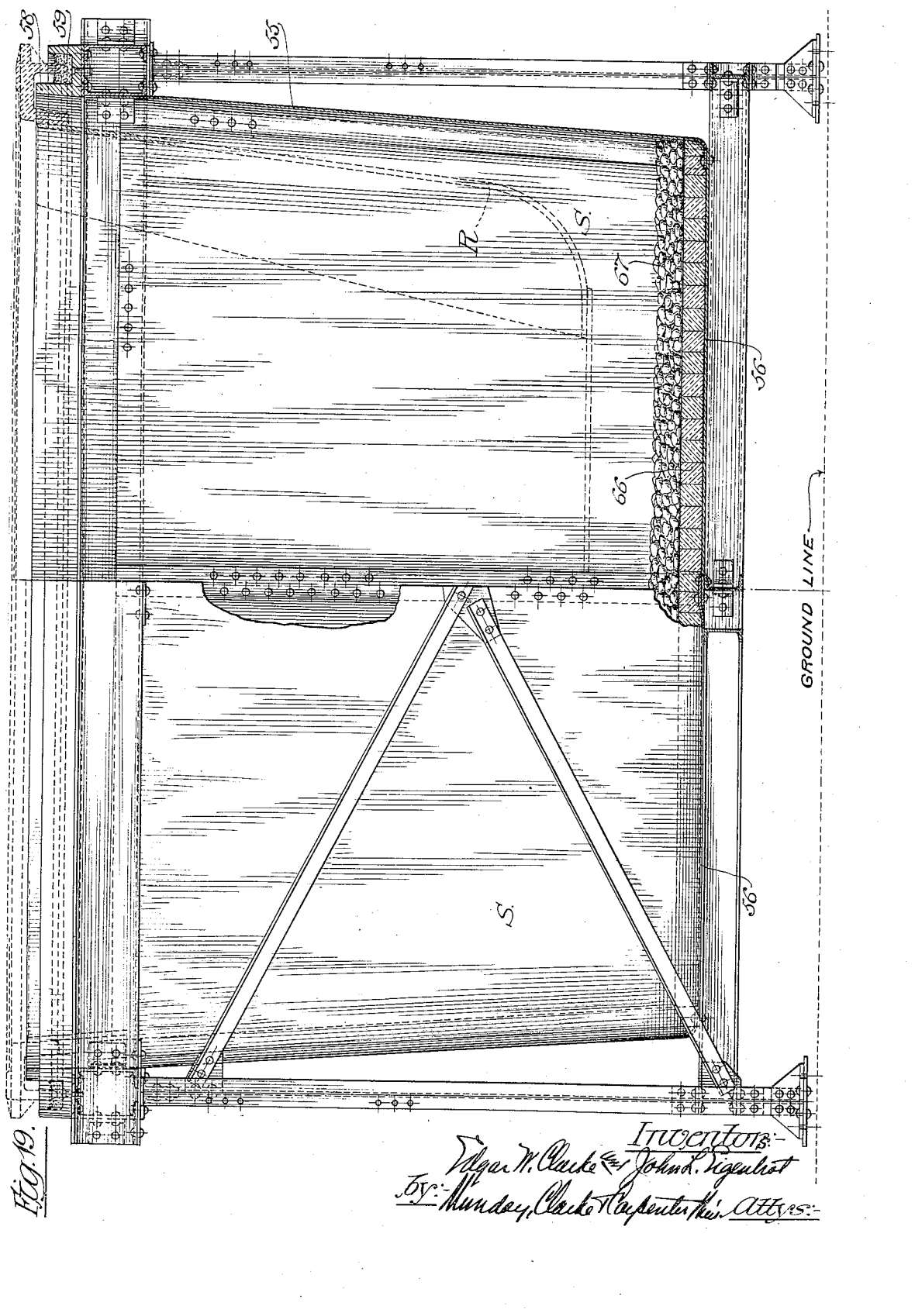

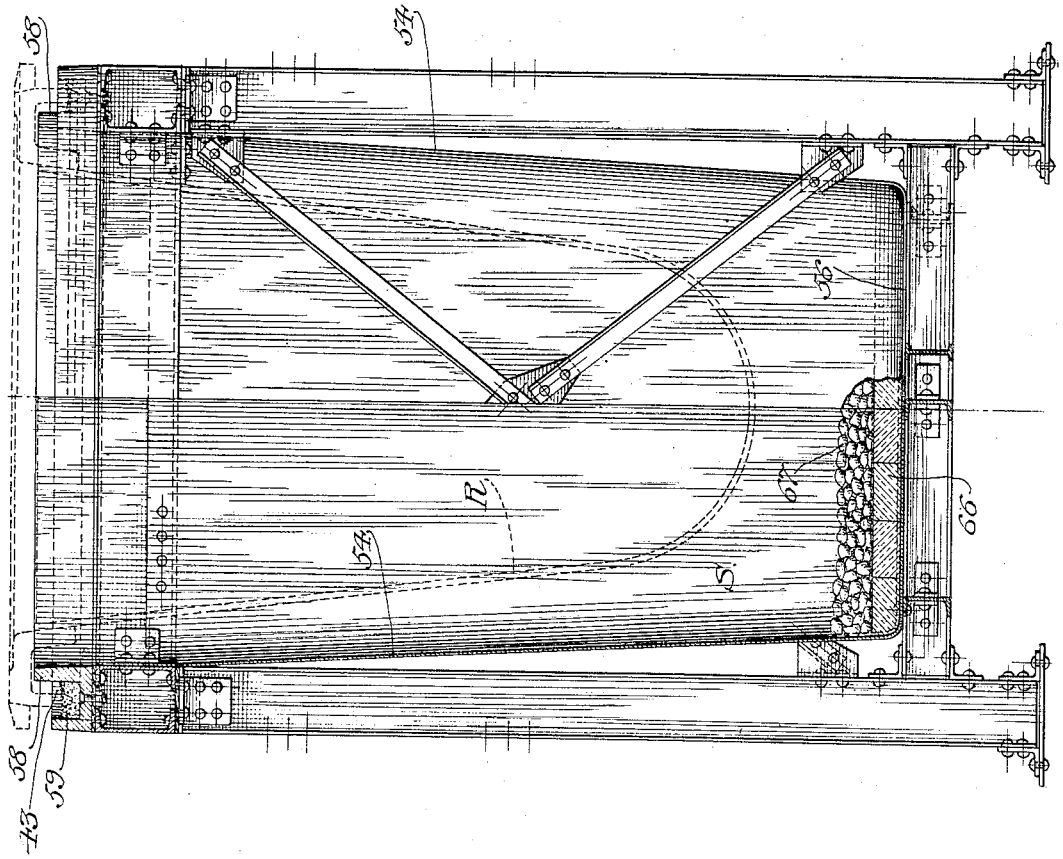

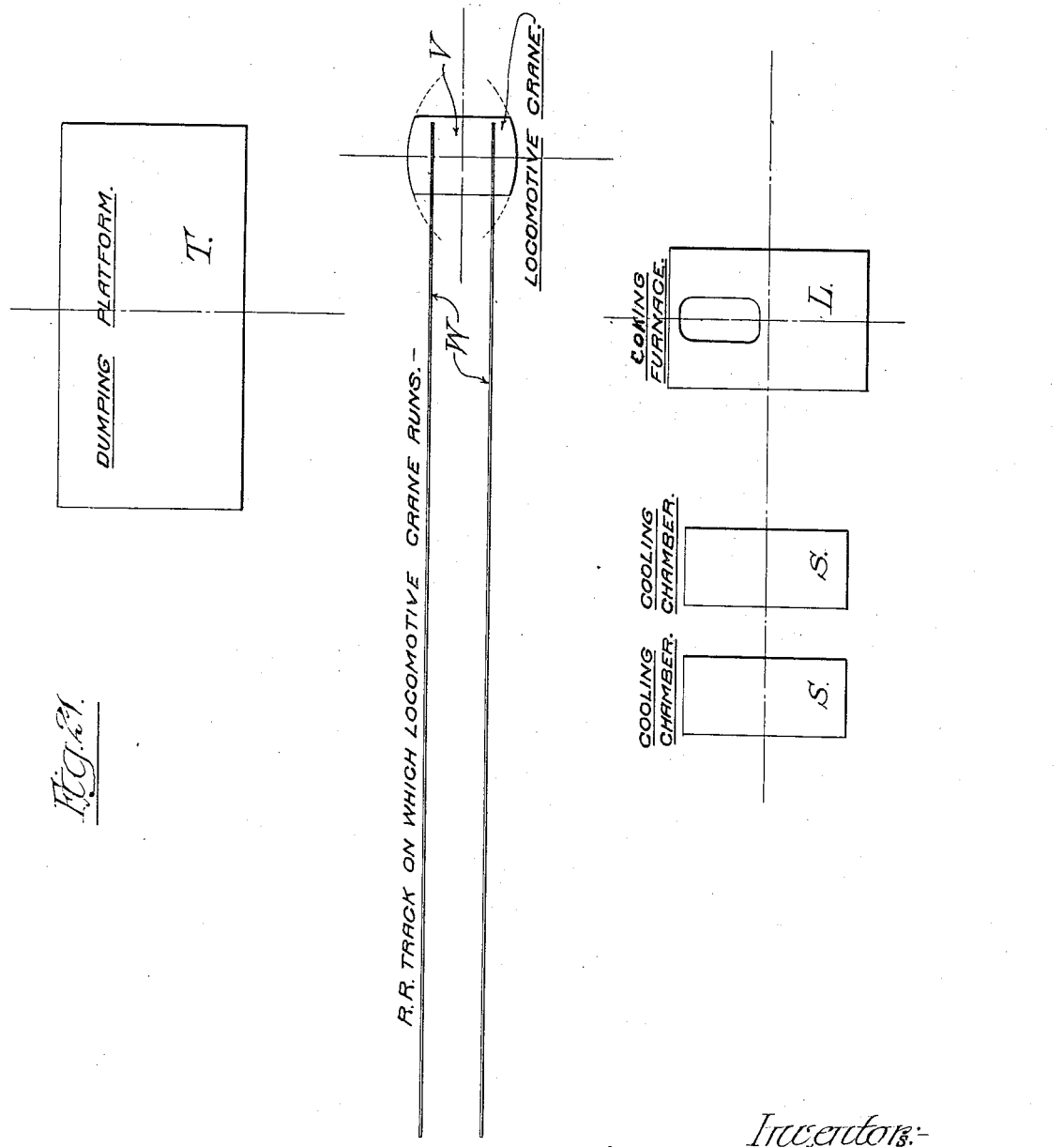

Patented May 19, 1931

1,806,146

UNITED STATES PATENT OFFICE

EDGAR W. CLARKE AND JOHN L. EIGENBROT, OF EVANSTON, ILLINOIS, ASSIGNORS TO AMERICAN TAR PRODUCTS COMPANY, OF CHICAGO, ILLINOIS A CORPORATION OF DELAWARE

APPARATUS AND PROCESS FOR COKING LIQUEFIABLE CARBONACEOUS MATERIALS

Application filed October 6, 1921. Serial No. 505,801.

This invention relates to the coking of liquefiable bituminous materials, such as pitch, tar and the like.

Important characteristics of the invention are: to effect the coking of such liquefiable bituminous materials in metallic coking retorts by the transmission through the wall of said retorts of coking heat derived from a source extraneous to that of the retort, without subjecting the wall of the retort to conditions tending to promote oxidation and consequent deterioration of the metal of the retort wall; similarly, to cool the coke while in the retort, by surrounding the wall of said retort with a substantially non-oxidizing cooling atmosphere, whereby oxidizing of the retort wall is checked during the cooling of the coke; to provide a furnace structure for developing the heat necessary to coke the material having features that promote high efficiency in combustion of the fuel, in transfer of the heat from the combustion products to the material to be coked in the retort, and in recovery of heat from the waste gases; and to provide a retort construction designed so as to have a large capacity, with a minimum required depth for heat penetration, and yet of such shape and configuration that practically all bending stresses are eliminated from the wall of the retort, with the result that the metal of the wall is subjected practically to no stresses other than those of direct tension and deformation of the retort is resisted, notwithstanding the subjection of the retort containing the large mass of material to the prolonged action of coking temperatures, and subsequent cooling.

In addition to the general objects recited above, the invention has for further objects such other improvements and advantages in construction or operation as may be found to obtain in the structures or processes hereinafter described or claimed.

In the accompanying drawings, forming a part of this specification and showing, for purposes of exemplification, a preferred form and manner in which the invention may be embodied and practiced, but without limiting the claimed invention specifically to such illustrative instance or instances:

Figure 1 is a front elevation of a furnace construction designed for effecting the coking of liquefiable bituminous materials in accordance with the improvements of the present invention;

Fig. 2 is a vertical sectional elevation taken transversely through the heating chamber and other parts of the furnace construction, in planes indicated by the line A—A of Fig. 3;

Fig. 3 is another vertical sectional elevation of the furnace construction, taken longitudinally through the heating chamber in a plane indicated by the line B—B of Fig. 2;

Fig. 4 is another longitudinal vertical section taken in a plane indicated by the line C—C of Fig. 2;

Fig. 5 is another longitudinal vertical section taken in planes indicated by the line D—D of Fig. 2;

Fig. 6 is a composite horizontal section taken in planes indicated by the line F—F of Fig. 2;

Fig. 7 is another horizontal section taken in a plane indicated by the line E—E of Fig. 2;

Fig. 8 is another horizontal section taken in a plane indicated by the line G—G of Fig. 3;

Fig. 9 is a detailed transverse vertical section through the heating chamber, taken in a plane indicated by the line H—H of Fig. 10 and showing a retort in position in said chamber;

Fig. 10 is an enlarged detailed section through the longitudinal axis of the heating chamber and the major axis of a retort in position in said heating chamber;

Fig. 11 is a top plan view of a retort and the heating chamber;

Fig. 12 is another section taken through the longitudinal axis of the upper portion of the heating chamber, showing partly in longitudinal section and partly in side elevation of a heating chamber cover applied to the top of the heating chamber;

Fig. 13 is a fragmentary top plan and horizontal sectional view of the heating chamber and its cover taken on planes indicated by the line K—K of Fig. 12;

Fig. 14 is a fragmentary detailed side elevational view of the device employed for securing the retort cover on the top of the retort;

Fig. 15 is a top plan and sectional view of the retort;

Fig. 16 is a side elevation and vertical section of the retort taken in a plane parallel with its major axis;

Fig. 17 is an end elevation and vertical section of the retort taken in a plane parallel with its minor axis;

Fig. 18 is a composite plan and sectional view of the cooling chamber;

Fig. 19 is a side elevation and longitudinal elevational section of the cooling chamber;

Fig. 20 is an end elevation and transverse vertical section of the cooling chambers;

Fig. 21 is a diagrammatic view showing a coking plant and the relative positions of the parts of the apparatus of said plant, and Fig. 22 is a fragmentary sectional view through the front wall of the generator.

The same characters of reference designate the same parts in each of the several views of the drawings.

In its present embodiment, the invention is applied to the coking of pitch, as an especially apt example of the utility of the invention. For convenience, the present description will be confined to this use of the invention; features both of apparatus and of process are, however, capable of other valuable applications; consequently the scope of the invention is not confined to the specific use and specific embodiment herein described as an illustrative example.

Referring to the drawings which illustrate a structural embodiment of apparatus for carrying out the improved coking process of the invention, and more particularly to Figs. 1 to 8 inclusive, there is shown a furnace construction for developing the heat requisite for coking the pitch which is charged into a retort positioned in a heating chamber of said furnace, as will hereinafter appear. The furnace L, according to the present embodiment of the invention, embodies in its construction a gas generator, such as the producer 11 incorporated in the structure of the furnace. The purpose of the generator is to generate the fuel gas, from the combustion of which heat is derived for coking the charge of pitch in the retort. Solid carbonaceous fuel is charged into the shaft of the producer fuel through the door 12 in the front wall of the furnace, and the charge of fuel in the producer shaft rests on a grate 13. Below the grate bars is a pit 14 containing water which serves to keep the grate bars cool, but primarily to keep the ash below the fusing point, thereby checking clinkering. The supply of water in the pit is replenished, as shown in Fig. 22, from a water pipe 60 which feeds water on to drip plates 61, permitting the water to trickle through the ash in the bottom of the fuel bed. The shaft of the producer is made relatively high, as compared with its horizontal dimensions, in order to maintain in said shaft a deep bed of fuel that extends from the grate 13 to the bottom of the charging door 12.

In the first stage, combustion of the fuel in the producer shaft is maintained. The primary air for supporting combustion in the lower region of the fuel bed enters the furnace through a regulable port or register 15, provided with a slide damper 16, and passing through an air duct 17 discharges into the producer shaft below the grate 13. Rising through the grate, the oxygen in the air combines with the combustible constituents of the fuel. This is the first stage of combustion and it occurs in the zone immediately above the grate. In this first stage combustion zone, the carbon in the fuel is essentially burned to carbon dioxide and the hydrogen to water vapor. The products of combustion from the first stage rise through the bed of fuel and as they ascend the fuel is heated. During the passage of the hot products of combustion up through the hot fuel, the carbon dioxide and water vapor of the combustion products are converted essentially into carbon monoxide and hydrogen thereby producing a combustible gas.

The combustible gas so produced is burned in the second combustion stage of the furnace operation. Such combustible gas collects in the upper portion of the producer shaft and discharges from the producer through fuel gas ports 18 in the top of the shaft into a combustion chamber 19. This combustion chamber is constituted of a long relatively low and narrow passageway extending parallel with the longitudinal dimension of the furnace and its heating chamber to be hereinafter described. The producer 11 is located in the front of the furnace assembly, and consequently the fuel gas passes into the front of the combustion chamber and traverses such combustion chamber to the rear end of the latter. As the fuel gas enters the combustion chamber 19 from the ports 18, it is supplied with secondary preheated air from the air ports 20, which extend transversely of the furnace and communicably connect with the opposite sides of the combustion chamber. The fuel gas burns in the secondary air supplied by these channels 20, as the mixture of air and fuel gas passes from front to rear through the combustion chamber 19. The secondary air supply is regulated relatively to the fuel gas supply, so as to effect substantially complete combustion in the combustion chamber 19 and to minimize the proportion of free oxygen in the products of combustion from the chamber 19, so that when such combustion products discharge from the chamber 19 through the opposite side ports 21, the combustion products enter the flues 22 as substantially non-oxidizing gases.

The flues 22 respectively extend along opposite sides of the horizontal combustion chamber 19 and substantially parallel therewith from rear to front of the furnace assembly. Passing along through these flues 22, the hot combustion products are discharged through series of ports 23 in the tops of the respective flues into a heating chamber 24 located above said flues. The heating chamber 24 is made relatively long as compared with its width to accommodate an elongated metallic retort R, which is positioned directly in the heating chamber 24. The material to be coked, such as the pitch, is contained in the metallic retort R, and the coking of such material is effected by the transmission through the wall of the retort R of the heat from the hot, substantially non-oxidizing products of combustion which discharge into the heating chamber 24 through the two series of ports 23 in the bottom of the heating chamber. As shown in the drawings, the series of ports 23 respectively extend along opposite sides of the longitudinal center line of the chamber 24, and, consequently the heating gases pass upwardly along the opposite side walls of the heating chamber in contact with the sides of the elongated retort, with the result that the heat penetrates the material in the retort in lines substantially parallel with the minor axis of the retort and the sides of the long mass of material are directly exposed to the heating effect of the combustion products.

From the top of the heating chamber 24, the combustion products discharge as waste gases through series of ports 25 located respectively in the opposite sides of the chamber 24 and communicably connected with a series of downflow vertical waste gas channels 26. If desired, a second series of ports, indicated by lines 27, may be provided in each side wall of the heating chamber 24, for use in conjunction with the ports 25 for directing the waste gases into the downflow channels 26, or as an alternative to said ports 25, when coking a relatively shallow mass of pitch in the retort R, in order to reduce the height of travel of the gases in the heating chamber 24 and to prevent prolonged contact of such gases with that portion of the retort above the mass of pitch. During the entire coking operation, the wall of the retort R is exposed only to the substantially non-oxidizing combustion products, access of air to the chamber 24 being prevented by means to be hereinafter described. Consequently, deterioration of the metallic wall of the retort, even though it be exposed to the prolonged action of a coking temperature, is practically avoided.

The waste gases which discharge into the vertical exhaust channels 26 pass downwardly through said channels to horizontal flues 207, and from said horizontal flues 207 the waste gases respectively discharge through exhaust ports 28 into an ordinary stack flue 29. The flow of the waste gases into the stack flue 29 may be regulated by slide dampers 30 controllable through inspection holes 31 extending from the front of the furnace into the respective horizontal flues 27.

The vertical downflow channels 26 are employed, in accordance with the invention, as recuperator tubes for the purpose of transferring heat from the waste gases passing through them to the secondary air that enters the combustion chamber 19 from the air supply ducts 20. The secondary air enters the furnace through ports 32 located in the rear wall of the furnace and passes into longitudinal horizontal air feed channels 33, that are respectively located on opposite sides of the generator 11. Access to the air feed channels 33 may be had through inspection holes 34 in the front wall of the furnace. The channels 33 respectively feed the incoming air to series of vertical air passages 35 through which the air passes to collecting flues 36 that are located on the opposite sides of the combustion chamber 19 and flues 22 and serve to deliver the preheated air to the opposite ducts 20 at the front of the furnace. The vertical air passages 35 are separated from the downflow waste heat passages 26 by longitudinal partitions 37, said partitions 37 permitting the heat of the waste gases to be transmitted to the incoming secondary air. In this manner, the secondary air supply is preheated by a recuperation of the waste gases from the heating chamber 24. If desired, a portion of the waste gas may be returned to the combustion chamber through a port 62, to effect an elongation of the flame, and to check flame concentration at the fuel gas and air inlets of the combustion chamber.

In accordance with the invention, the retort R is constructed so as to be of maximum capacity for containing the pitch to be coked in order to insure the maximum production of coke per unit coking time in the heating chamber 24, and yet to avoid deformation of the retort from the prolonged action of the coking heat to which the wall of the retort is subjected and from the great weight of the material held in the retort. Referring now more particularly to Figs. 9 to 11 inclusive and Figs. 15 to 17 inclusive, the retort R is constituted essentially of a metallic vessel formed preferably of sheet steel, or other suitable sheet metal. As shown especially in Fig. 15, the surrounding wall of the retort R is elongated along the major axis $x$—$x$, but relatively narrow along its minor axis $y$—$y$, thereby providing a vessel or container having the long sides 38 and the respectively narrow ends 39. The bottom 40 of the retort is rounded on an axis substantially parallel with the major axis; the downwardly and inwardly inclined sides 38 merge and round into the rounded bottom 40, as shown in Fig. 17; the downwardly and inwardly inclined ends 39 merge and round into the opposite ends of the rounded bottom 40. The inclined sides merge into the inclined ends by rounded corners 41, as shown more particularly in Fig. 15. The curving of the sides 38 into the bottom 40 is such that the configuration of the wall of the retort is substantially a catenary in vertical cross section taken on a plane substantially parallel with the minor axis of the retort; and the curving of the opposite ends 39 into the bottom 40 is such that the end portions of the wall of the retort are substantially catenary in configuration in vertical cross section taken on a plane parallel with the major axis of the retort. With a retort constructed in the manner above specified, sharp edges and corners are eliminated both at the edges and corners of the retort wall. The elongated retort is thus constructed and shaped to contain a maximum quantity of pitch to be coked, with a minimum required depth for the penetration of coking heat, and yet to provide a maximum resistance against deformation. Secured to and extending around the open top of the retort body, is a flange 42 provided with a depending apron 43 which extends all the way around the flange 42 and enters a body of sand 44 in a trough 45 mounted on and extending around the top of the heating chamber 24. When the retort R is in position in the heating chamber 24, as shown particularly in Figs. 9 and 10, the sand 44 which spreads around the lower portion of the apron 43 forms a seal to prevent leakages past the flange of the retort and thus prevents the escape of heating gases or the entry of air into the heating chamber. The top of the retort R is closed by a removable cover 46 which rests on the flange 42 and is clamped in closed position thereon by means of clamping shackles 47. These clamping shackles 47 are pivoted at their upper ends, as shown at 48, on the cover and are provided at their lower ends with heads 49 which respectively engage beneath pairs of abutments 50 carried by the flange 42. The cover 46 may be removed from the retort, when it is desired to dump the contents of the retort by lifting the several clamping shackles 47 so that the heads 49 are clear of the abutments 50.

The cover 46 is provided with a distillate outlet 51 through which the distillates and gases that rise from the coking of the pitch in the retort are conveyed to a suitable by-product recovery apparatus. When the retort is in position in the heating chamber 24, the distillate outlet 51 may be coupled with any preferred type of gas main. Located in the retort 46 is a plurality of holes 52 some of which may be employed as inspection holes normally closed by removable plugs. Into the center hole 52 as well as into an end hole and the cap of the distillate outlet 51 are inserted steam pipes 53 through which steam is injected into the interior of the retort, to check foaming during the foaming period.

When the coking of the pitch has been completed in the non-oxidizing atmosphere in the heating chamber 24, the retort R is removed from the heating chamber, and placed in a cooling chamber S. After the retort has been removed and until another retort is positioned for effecting a further coking operation, the heating chamber 24 may be closed by a cover 63 having a depending apron 64 which dips into the sand 44. The construction of the cooling chamber S is shown in Figs. 18 to 20 inclusive. The cooling chamber S is constituted essentially of inclined sides 54, inclined ends 55 and a bottom 56, the sides, ends and bottom being constructed preferably of sheet metal. The wall of the cooling chamber S is supported by a frame 57 and mounted on the top of said frame is a trough 58 containing a body of sand 59. When the retort R is in position in the cooling chamber the apron 43 projects into the sand in the trough 58, forming a seal to prevent the entry of air into the cooling chamber. As shown in Figs. 19 and 20 the cooling chamber is made somewhat deeper than the retort and resting on the bottom of the cooling chamber is a layer of fire brick 60 on which may be placed a quantity of solid carbonaceous fuel, such as coal. The heat of the retort and the coke therein will ignite the coal in the bottom of the cooling chamber and the burning coal will consume any free oxygen in the cooling chamber. The entry of further free oxygen being prevented by the sand seal 59, the cooling of the retort and of the formed coke is effected in a substantially non-oxidizing surrounding atmosphere. Consequently oxidation and deterioration of the wall of the retort, during the cooling period are avoided.

The layout of a plant for coking pitch, according to the process and with the usual apparatus described above is illustrated in Fig. 21. When the coking of the material in a retort R in the furnace L has been completed, the retort is lifted out of the furnace L by a locomotive crane V running on a railway track W and is carried by said crane and deposited in a cooling chamber S. Any other preferred type of crane may be employed. As soon as the retort R and the coke therein have been cooled, the retort is lifted out of the cooling chamber by the said crane V and is carried to a dumping platform T where the cover is removed and the coke is dumped out of the retort. The retort is then refilled and repositioned in the furnace to effect a further coking operation. In practice, a plurality of retorts will be employed in order that the coking of the pitch may be carried on substantially continuously.

The invention as hereinabove set forth is embodied in a particular form of construction but may be variously embodied within the scope of the claims hereinafter made.

What is claimed is:

1. In a furnace construction for coking liquefiable carbonaceous materials, in combination: a gas generator; a long narrow combustion chamber receiving fuel gas from said gas generator; recuperators the inflow passages of which are communicably connected with said combustion chamber for supplying thereto the air required for the combustion of the gaseous fuel in said chamber; flues extending along the opposite sides of said combustion chamber and communicably connected therewith at the end opposite to the combustion chamber inlet; a heating chamber located above the combustion chamber and receiving products of combustion from said flues by series of ports respectively disposed on opposite sides of the longitudinal center of said heating chamber, the heating chamber being also communicably connected by outflow passages with the outflow passages of the recuperators; a metallic coking retort positioned in said heating chamber said retort having marginal flanging engaging in fluent sealing material to prevent passage of air therebetween; and means for preventing access of air past said coking retort into the heating chamber, whereby the coking of material contained in said coking retort is effected in a substantially non-oxidizing atmosphere by the combustion products discharged into the heating chamber from said flues; substantially as specified.

2. In a furnace construction for coking liquefiable carbonaceous materials, in combination: a gas generator; a long narrow combustion chamber receiving fuel gas from said gas generator; recuperators the inflow passages of which are communicably connected with said combustion chamber for supplying thereto the air required for the combustion of the gaseous fuel in said chamber; flues extending along the opposite sides of said combustion chamber and communicably connected therewith at the end opposite to the combustion chamber inlet; a heating chamber located above the combustion chamber and receiving products of combustion from said flues by series of ports respectively disposed on opposite sides of the longitudinal center of said heating chamber, the heating chamber being also communicably connected by outflow passages with the outflow passages of the recuperators; and a metallic coking retort positioned in said heating chamber marginal flanging on the upper edges of said retort, said flanging engaging in sand to prevent passage of air therebetween; substantially as specified.

3. In a furnace construction for coking liquefiable carbonaceous materials, in combination: a gas generator; a long narrow combustion chamber receiving fuel gas from said gas generator; recuperators the inflow passages of which are communicably connected with said combustion chamber for supplying thereto the air required for the combustion of the gaseous fuel in said chamber; flues extending along the opposite sides of said combustion chamber and communicably connected therewith at the end opposite to the combustion chamber inlet; and a heating chamber located above the combustion chamber and receiving products of combustion from said flues by series of ports respectively disposed on opposite sides of the longitudinal center of said heating chamber, the heating chamber being also communicably connected by outflow passages with the outflow passages of the recuperators; substantially as specified.

4. In a furnace construction for coking liquefiable carbonaceous materials, in combination: a combustion chamber for the combustion of gaseous fuel; recuperators the inflow passages of which are communicably connected with said combustion chamber for supplying thereto the air required for the combustion of the gaseous fuel in said chamber; flues extending along the opposite sides of said combustion chamber and communicably connected therewith at the end opposite the combustion chamber inlet; a heating chamber located above the combustion chamber and receiving products of combustion from said flues by series of ports respectively disposed on opposite sides of the longitudinal center of said heating chamber, the heating chamber being also communicably connected by outflow passages with the outflow passages of the recuperator; a metallic coking retort positioned in said heating chamber; and means for preventing access of air past said coking retort into the heating chamber, said means comprising fluent material and members engaging therein whereby the coking of material contained in said coking retort is effected in a substantially non-oxidizing atmosphere by the combustion products discharged into the heating chamber from said flues, substantially as specified.

5. In a furnace construction for coking liquefiable carbonaceous materials, in combination: a combustion chamber for the combustion of gaseous fuel; recuperators the inflow passages of which are communicably connected with said combustion chamber for supplying thereto the air required for the combustion of the gaseous fuel in said chamber; flues extending along the opposite sides of said combustion chamber and communicably connected therewith at the end opposite to the combustion chamber inlet; a heating chamber located above the combustion chamber and receiving products of combustion from said flues by series of ports respectively disposed on opposite sides of the longitudinal center of aid heating chamber, the heating chamber being also communicably connected by outflow passages with the outflow passages of the recuperators; and a metallic coking retort positioned in said heating chamber flanging on said retort engaging in sand to prevent access of air therebetween; substantially as specified.

6. In a furnace construction for coking liquefiable carbonaceous materials, in combination: a combustion chamber for the combustion of gaseous fuel; recuperators the inflow passages of which are communicably connected with said combustion chamber for supplying thereto the air required for the combustion of the gaseous fuel in said chamber; flues extending along the opposite sides of said combustion chamber and communicably connected therewith at the end opposite to the combustion chamber inlet; and a heating chamber located above the combustion chamber and receiving products of combustion from said flues by series of ports respectively disposed on opposite sides of the longitudinal center of aid heating chamber, the heating chamber being also communicably connected by outflow passages with the outflow passages of the recuperators; substantially as specified.

7. In a furnace construction for coking liquefiable carbonaceous materials, in combination: a gas generator; a combustion chamber receiving fuel gas from said gas generator; recuperators the inflow passages of which are communicably connected with said combustion chamber for supplying thereto the air required for the combustion of the gaseous fuel in said chamber; flues extending along the opposite sides of said combustion chamber and communicably connected therewith at the end opposite to the combustion chamber inlet; a heating chamber located above the combustion chamber and receiving products of combustion from said flues by series of ports respectively disposed on opposite sides of the longitudinal center of said heating chamber, the heating chamber being also communicably connected by outflow passages with the outflow passages of the recuperator; a metallic coking retort positioned in said heating chamber; and means for preventing access of air past said coking retort into the heating chamber, said means comprising fluent material and flanging dipping therein whereby the coking of material contained in said coking retort is effected in a substantially non-oxidizing atmosphere by the combustion products discharged into the heating chamber from said flues; substantially as specified.

8. In a furnace construction for coking liquefiable carbonaceous materials, in combination: a gas generator; a combustion chamber receiving fuel gas from said gas generator; recuperators the inflow passages of which are communicably connected with said combustion chamber for supplying thereto the air required for the combustion of the gaseous fuel in said chamber; flues extending along the opposite sides of said combustion chamber and communicably connected therewith at the end opposite to the combustion chamber inlet; and a heating chamber located above the combustion chamber and receiving products of combustion from said flues by series of ports respectively disposed on opposite sides of the longitudinal center of said heating chamber, the heating chamber being also communicably connected by outflow passages with the outflow passages of the recuperators; substantially as specified.

9. In a furnace construction for coking liquefiable carbonaceous materials, in combination: a heating chamber; a combustion chamber; duct means communicably connecting said combustion chamber with said heating chamber for discharging gases from the combustion chamber into the heating chamber as products of combustion; a metallic coking retort positioned in said heating chamber; and means for preventing access of air past said coking retort into the heating chamber, said means comprising depending flanging engaging in sand contained in a channel, whereby the coking of material contained in said coking retort is effected in a substantially non-oxidizing atmosphere by the combustion products discharged into the heating chamber; substantially as specified.

10. In a furnace construction for coking liquefiable carbinaceous materials having a heating chamber and a combustion chamber, the improvement characterized by distributing chamber and duct means for discharging gases from said combustion chamber into said heating chamber as products of secondary combustion, whereby material to be coked may be heated in said heating chamber solely by completely burnt products of combustion; substantially as specified.

11. In a furnace construction for coking liquefiable carbonaceous materials having a heating chamber and a combustion chamber, the improvement characterized by duct means for discharging gases from said combustion chamber into said heating chamber as products of complete combustion, whereby material to be coked may be heated in said heating chamber solely by products of complete combustion, combined with a recuperative system, the inflow passages of which are communicably connected with the combustion chamber for supplying air to support combustion therein and the outflow passages of which are communicably connected with the heating chamber; substantially as specified.

12. The process of coking liquefiable bituminous materials in metallic coking retorts which consists in surrounding a retort containing the material to be coked with a substantially non-oxidizing atmosphere maintained at a coking temperature and, when the coking is completed, cooling the retort and its contents in a substantially non-oxidizing atmosphere; substantially as specified.

13. A metallic coking retort, for containing liquefiable carbonaceous materials during the coking thereof and for transmitting through its wall to such materials coking heat derived from a source extraneous to that of the retort, the wall of said retort being constituted of a rounded bottom, relatively long inclined sides respectively merging into said rounded bottom and relatively narrow inclined ends respectively merging into the ends of said rounded bottom, whereby the retort wall is resistant to deformation from the prolonged action of such coking heat and the weight of the material held in the retort; substantially as specified.

14. A metallic coking retort, for containing liquefiable carbonaceous materials during the coking thereof and for transmitting through its wall to such materials coking heat developed from a source extraneous to that of the retort, the wall of said retort being elongated horizontally and being substantially a catenary in vertical cross section taken on a plane parallel with the minor axis of the retort, whereby the wall is resistant to deformation from the prolonged action of such coking heat and the weight of the material held in the retort; substantially as specified.

15. A horizontally elongated metallic coking retort, for containing liquefiable carbonaceous materials during the coking thereof and for transmitting through its wall to such materials coking heat derived from a source extraneous to that of the retort, the sides of the retort wall extending parallel with the major axis of the retort and the ends of the retort wall extending parallel with its minor axis, the wall of said retort being substantially a catenary in vertical cross section taken on a plane parallel with the aforesaid minor axis, and the ends of the retort wall being substantially catenary in configuration on a vertical cross section taken in a plane parallel with the aforesaid major axis, whereby the wall is resistant to deformation from the prolonged action of such coking heat and the weight of the material held in the retort; substantially as specified.

16. A furnace construction comprising, in combination: a primary combustion chamber; a horizontally elongated secondary combustion chamber; means located at one end of said secondary combustion chamber for feeding fuel gas from said primary combustion chamber to said secondary combustion chamber; means for feeding secondary air therefor to said secondary combustion chamber; a heating chamber adjacent said secondary combustion chamber extending longitudinally thereof and adapted to be heated by products of combustion from said secondary combustion chamber; a metallic coking retort positioned within the longitudinal center of said heating chamber; a horizontal distributing flue communicating with the opposite end of said secondary combustion chamber and disposed substantially parallel therewith; and a series of ducts spaced from each other along said horizontal distributing flue and communicating the same with said heating chamber, said horizontal distributing flue and said series of ducts being disposed at one side of the longitudinal center of said heating chamber and being so adapted to discharge gases vertically into the heating chamber that heating of the retort in said heating chamber by combustion products from the secondary combustion chamber is restricted to the sides of the retort, whereby coking of a mass of material in said retort may be effected substantially entirely by indirect heating laterally inwardly of the mass with non-oxidizing gases.

17. A furnace construction comprising, in combination: a primary combustion chamber; a secondary combustion chamber; means for feeding fuel gas from said primary combustion chamber to said secondary combustion chamber; means for feeding secondary air therefor to said secondary combustion chamber; a heating chamber adjacent said secondary combustion chamber and adapted to be heated by products of combustion from said secondary combustion chamber; a metallic coking retort positioned centrally within said heating chamber; a distributing flue communicating with said secondary combustion chamber to receive products of combustion therefrom; and a series of ducts spaced from each other along said distributing flue and communicating the same with said heating chamber, said distributing flue and said series of ducts being disposed aside the center of said heating chamber and being so adapted to discharge gases from said secondary combustion chamber in the heating chamber that heating of the retort in said heating chamber by said gases is restricted to the sides of the retort, whereby coking of a mass of material in said retort may be effected substantially entirely by indirect heating laterally inwardly of the mass with non-oxidizing gases.

18. A metallic retort for coking liquefiable carbonaceous material comprising: a metallic receptacle for holding the said material and adapted for suspension in a heating chamber therefor during heating of the contents of said receptacle and also adapted for suspension in a separate cooling chamber therefor during cooling of the same contents of said receptacle; suspension means fixed to the receptacle and adapted to both suspend said receptacle within and, with said receptacle, form the top for said heating chamber, said suspension means being also adapted to both suspend said receptacle within and close and seal, said heating chamber when said receptacle is in the same and also said cooling chamber when said receptacle is in said cooling chamber; and a cover for said retort adapted for lifting and shifting the same, said cover being connected to and shiftable with said suspension means for effecting the lifting and shifting of the retort without uncovering the same and being removable from said retort independently of said suspension means.

In testimony whereof we have hereunto set our hands.

EDGAR W. CLARKE.
JOHN L. EIGENBROT.